(12) United States Patent  
Burton et al.

(10) Patent No.: US 12,473,184 B2  
(45) Date of Patent: Nov. 18, 2025

(54) MULTI-FUNCTION USER INTERFACE FOR A FORKLIFT

(71) Applicant: Toyota Material Handling, Inc., Columbus, IN (US)

(72) Inventors: Caleb Burton, Indianapolis, IN (US); Blake Davis, Indianapolis, IN (US); Britt Nathaniel Minks, Columbus, IN (US); Paul Malcomb, Madison, IN (US); Kevin Shaw, Columbus, IN (US); Dennis P. Huffer, Indianapolis, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 684 days.

(21) Appl. No.: 17/037,973

(22) Filed: Sep. 30, 2020

(65) Prior Publication Data

US 2021/0094809 A1    Apr. 1, 2021

Related U.S. Application Data

(60) Provisional application No. 62/908,889, filed on Oct. 1, 2019.

(51) Int. Cl.
*B66F 9/20* (2006.01)
*B60K 28/04* (2006.01)
(Continued)

(52) U.S. Cl.
CPC .............. *B66F 9/20* (2013.01); *B60K 28/04* (2013.01); *B66F 9/0759* (2013.01); *H03K 17/90* (2013.01);
(Continued)

(58) Field of Classification Search
CPC .......... B66F 9/20; B66F 9/0759; B60K 28/04; G05D 2201/0216; H03K 17/90; H03K 17/962; B60L 2200/42
See application file for complete search history.

(56) References Cited

U.S. PATENT DOCUMENTS

2006/0061177 A1* 3/2006 Billger ................. B60N 2/0228
297/344.21
2008/0311993 A1* 12/2008 Beutler ..................... G05G 1/06
463/38

(Continued)

FOREIGN PATENT DOCUMENTS

EP        2518004 A1 * 10/2012 ............ B66F 9/0759
JP    H07109098 A  *  4/1995
(Continued)

OTHER PUBLICATIONS

JP-2001322462-A, Ogino et al. Espacenet English translation, Nov. 20, 2001 (Year: 2001).*

(Continued)

*Primary Examiner* — Benjamin C Lee
*Assistant Examiner* — Nathan P Brittingham
(74) *Attorney, Agent, or Firm* — Husch Blackwell LLP

(57) ABSTRACT

A forklift includes a multi-function user interface. The multi-function user interface comprises a body, a manipulator assembly supported on the body, and an implement. The manipulator assembly includes a grip configured to be gripped by a user. The implement has a plurality of functions, the plurality of functions being controlled by inputs from the manipulator assembly.

27 Claims, 16 Drawing Sheets

(51) Int. Cl.
*B66F 9/075* (2006.01)
*H03K 17/90* (2006.01)
*H03K 17/96* (2006.01)

(52) U.S. Cl.
CPC ........ *H03K 17/962* (2013.01); *B60L 2200/42* (2013.01)

(56) References Cited

U.S. PATENT DOCUMENTS

| | | | | |
|---|---|---|---|---|
| 2009/0200116 | A1* | 8/2009 | Wiggins | B66F 9/20 187/224 |
| 2010/0152976 | A1* | 6/2010 | White | A61B 5/14546 700/79 |
| 2010/0255915 | A1* | 10/2010 | Spradley | G09B 9/08 463/38 |
| 2012/0037485 | A1* | 2/2012 | Sitarski | H03K 17/962 200/600 |
| 2012/0176315 | A1* | 7/2012 | Cordes | G06F 3/0234 345/161 |
| 2018/0265028 | A1* | 9/2018 | Mori | B60N 2/797 |
| 2020/0290236 | A1* | 9/2020 | Bjornstad | B28C 5/4206 |

FOREIGN PATENT DOCUMENTS

| | | | | |
|---|---|---|---|---|
| JP | 2706377 | B2 | * | 1/1998 |
| JP | 2001322462 | A | * | 11/2001 |
| KR | 101305024 | B1 | * | 9/2013 |
| KR | 101770392 | B1 | * | 9/2017 ............ E02F 9/2004 |

OTHER PUBLICATIONS

JP 2706377 B2, Aoki et al. Foreign patent document English translation (Year: 1998).*

* cited by examiner

MULTI-FUNCTION USER INTERFACE FOR A FORKLIFT

CROSS-REFERENCE TO RELATED APPLICATIONS

This application claims priority under 35 U.S.C. § 119(e) to U.S. Provisional Patent Application Ser. No. 62/908,889, filed Oct. 1, 2019, which is expressly incorporated by reference herein.

TECHNICAL FIELD

The present disclosure is related to user interface and input devices for material handling vehicles, such as forklift, for example. More specifically, the present disclosure is related to a multi-function user interface that is arranged to allow a user to control multiple operational functions of a forklift with a single hand.

BACKGROUND

Material handling vehicles, such as forklifts, are used by an operator to move materials. The operation of such a vehicle in an industrial environment involves time and labor to move materials from location to location so that it may be processed by people or equipment. Notably, the operation of the forklift, also known as a forktruck, often occurs continuously over several hours in a day. Thus, inefficiencies in the operation of the forklift can propagate into inefficiencies in the overall operation that the forktruck is used within. For example, when adjustments have to be made to the mast or forks of the forktruck, excessive time in making those adjustments can consume labor that reduces the overall operational capacity of the forklift.

In addition, the user interfaces are constantly interacted with by the user to make adjustments to the operational functions of the forklift. Poorly positioned or configured user interfaces can cause fatigue for the operator, reducing their overall productivity. The present disclosure addresses the productivity and ergonomics of the operation of a forklift by providing multi-function user interface that allows a user to operate various functions of a forklift from a single user interface arranged for the ease of use of the operator with limited fatigue.

SUMMARY

The present disclosure includes one or more of the features recited in the appended claims and/or the following features which, alone or in any combination, may comprise patentable subject matter.

According to a first aspect of the present disclosure, a forklift includes a multi-function user interface with a body, a manipulator assembly, and an implement. The manipulator assembly is supported on the body and includes a grip configured to be gripped by a user. The implement has a plurality of functions, the plurality of functions being controlled by inputs from the manipulator assembly. The manipulator assembly detects the presence of a user before any input to control a function of the implement is transmitted.

In some embodiments, the manipulator assembly may include a sensor to detect the presence of a user. In some embodiments, the sensor may a capacitive sensor.

In some embodiments, the body may be configured to provide a storage space adjacent the manipulator assembly. In some embodiments, the body may further include a USB receptacle.

In some embodiments, the manipulator assembly may include a plurality of user input devices. In some embodiments, the manipulator assembly may include a user input device providing a proportion signal to control the implement. In some embodiments, the manipulator assembly may comprise a joystick.

In some embodiments, the manipulator assembly may be positioned to be gripped by a user while the user rests their arm.

In some embodiments, the manipulator assembly may include one or more of a user input device that controls the tilt of the implement, a user input device that controls the lateral position of a lift platform of the implement, a user input device that controls the height of a lift platform of the implement, and a user input device that controls the lateral spacing of components of the implement.

According to a second aspect of the present disclosure, a manipulator assembly for controlling operating functions of an implement positioned on the front of a vehicle includes a grip configured to be gripped by a user, and the manipulator assembly detects the presence of a user before any input to control a function of the implement is transmitted from the manipulator assembly.

In some embodiments, the manipulator assembly may include a body configured to provide a storage space adjacent the manipulator assembly. In some embodiments, the body further includes a USB receptacle.

In some embodiments, the manipulator assembly may include a capacitive sensor to detect the presence of a user.

In some embodiments, the manipulator assembly may include a plurality of user input devices.

In some embodiments, the manipulator assembly may include a user input device providing a proportion signal to control the implement.

In some embodiments, the manipulator assembly may comprise a joystick.

In some embodiments, the manipulator assembly may be positioned to be gripped by a user while the user rests their arm.

In some embodiments, the manipulator assembly may include one or more of a user input device that controls the tilt of the implement, a user input device that controls the lateral position of a lift platform of the implement, a user input device that controls the height of a lift platform of the implement, and a user input device that controls the lateral spacing of components of the implement.

In some embodiments, the manipulator assembly may include at least one input device having a Hall Effect sensor.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
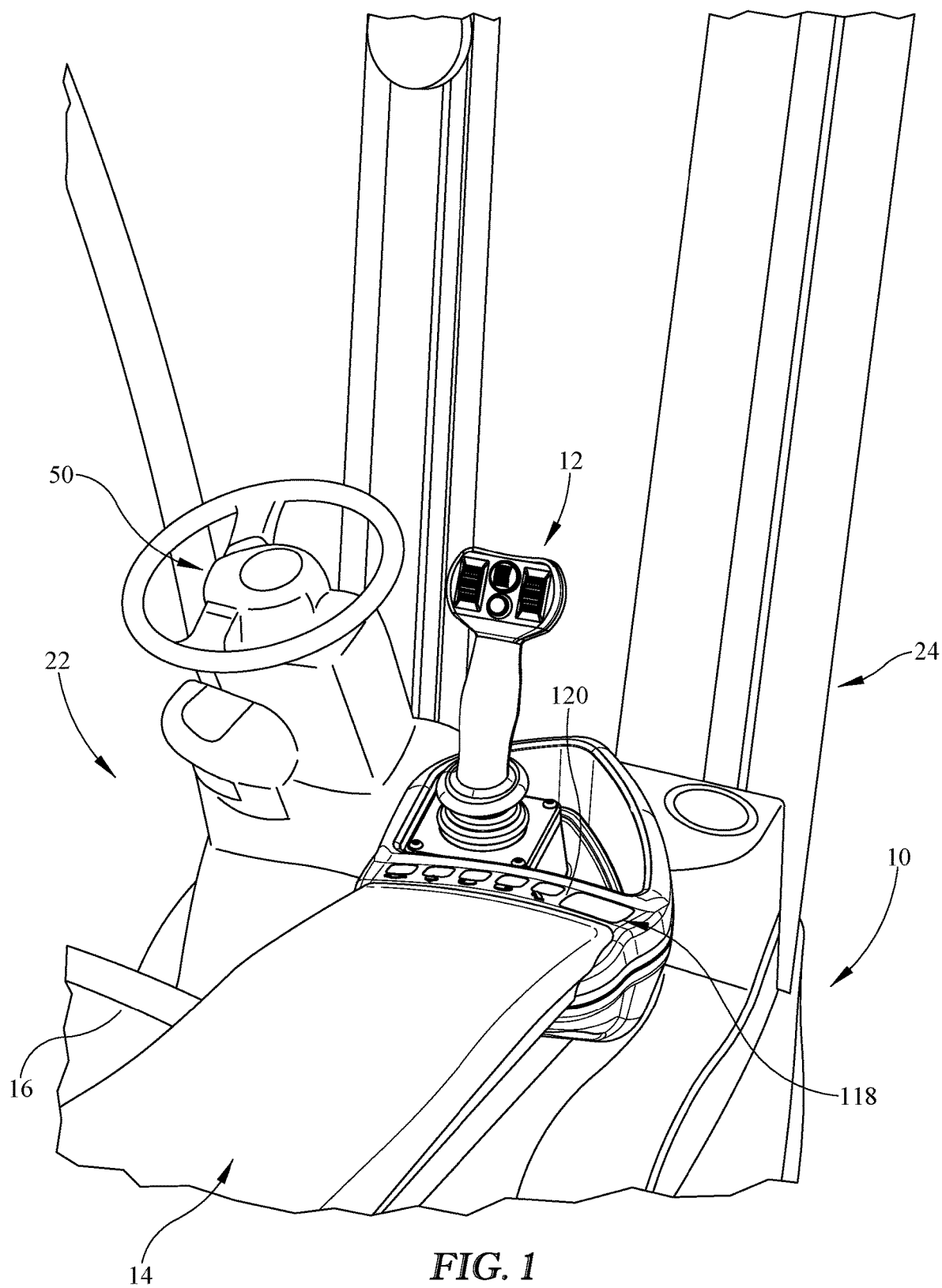
FIG. 1 is a perspective view of a forklift that includes a multi-function user interface according to the present disclosure.

An operator compartment 22 of a forklift 10 is shown in FIG. 1 to include a user interface 12 that is positioned at the end of on an armrest 14 of a seat 16 of the forklift 10. The user interface 12 is accessible by a user while their arm rests on the armrest 14. As will be explained in further detail below, the user interface 12 includes multiple user input devices which allow the operator to vary functions of the forklift 10 while engaging the user interface 12 with their hand positioned on the user interface 12. This reduces the movement necessary for the operator to effect changes in various functions of the forklift 10.

Figure 2:
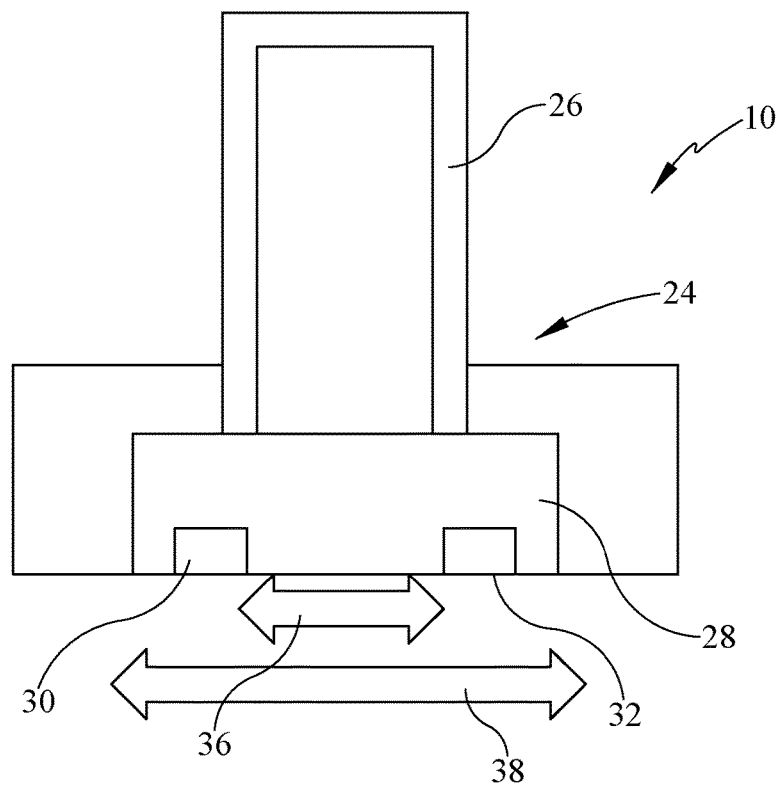
FIG. 2 is a diagrammatic representation of the forklift of FIG. 1 viewed from the front of the forklift.
Figure 3:
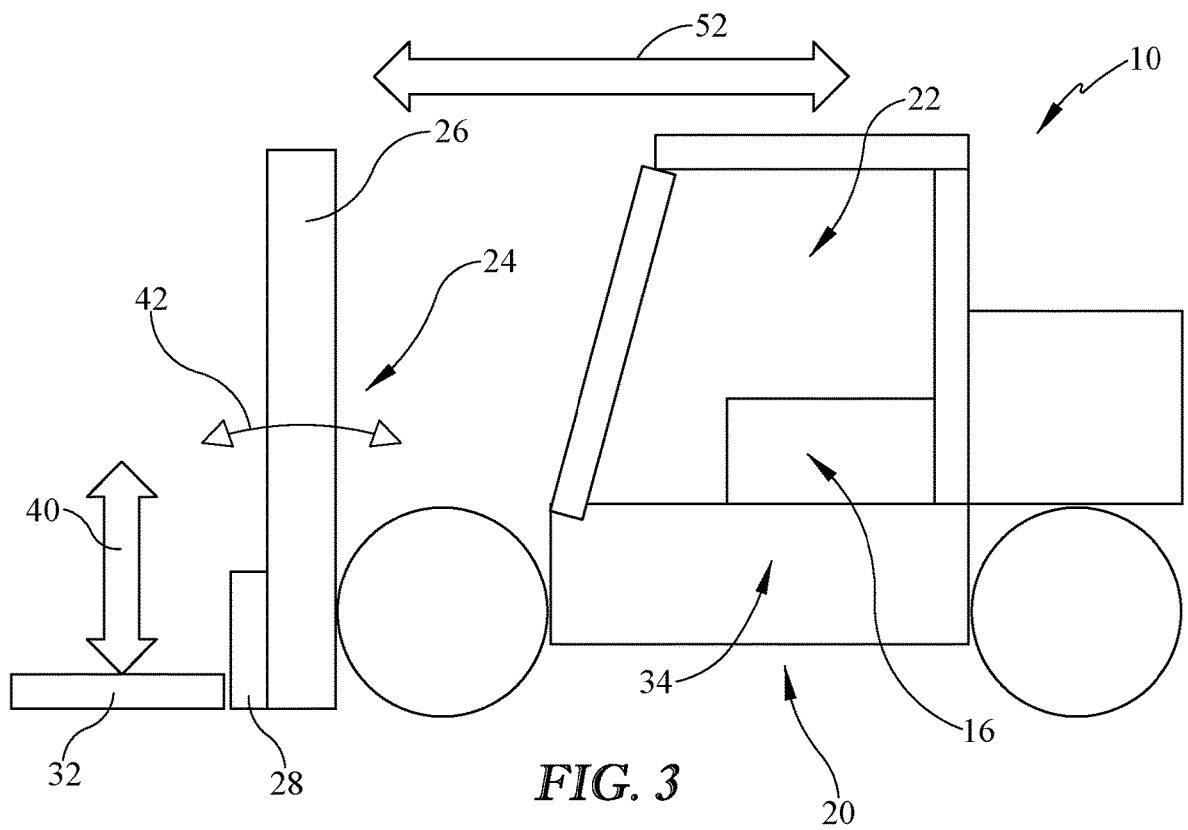
FIG. 3 is a diagrammatic representation of the forklift of FIG. 1 viewed from the left side of the forklift.

Referring to the diagrammatic representation of the forklift 10 in FIGS. 2 and 3, it can be seen that the forklift 10 includes a vehicle 20 with the operator compartment 22. In the embodiment disclosed herein, the forklift 10 includes an implement 24 supported from the vehicle 20. The implement 24 includes a mast 26 and a lift platform 28 supported on the mast 26. The lift platform 28 includes a pair of forks 30, 32. The vehicle 20 includes a prime mover 34, embodied as an internal combustion engine, which provides power to the vehicle 20 and operates a hydraulic pump (not shown) that provides hydraulic fluid flow to hydraulic actuators (not shown) that adjust operational aspects of the implement 24 as is known in the art. In some embodiments, the prime mover 34 may be embodied as an electrically powered motor with an on board battery, for example. Operation of functions of the forklift 10 are provided by the hydraulic system. For example, the forks 30, 32 can be adjusted to vary a width between the forks 30, 32 as indicated by an arrow 36 in FIG. 2. In addition, the lift platform 28 can be adjusted laterally relative to the mast 26 as indicated by an arrow 38. The lift platform 28 can also be moved vertically relative to the mast 26 as indicated by an arrow 40 in FIG. 3. Still further, the mast 26 can be tilted forward and back as indicated by an arrow 42 in FIG. 3. The tilting of the mast 26 also pivots the forks 30, 32 as indicated by arrow 44. In this way, a load may be positioned on the forks 30, 32 and the forks 30, 32 may be tilted to secure the load during transport or to assist in easing the load off from the forks 30, 32 by lowering the outboard ends of the forks 30, 32.

The forklift 10 also includes a steering wheel 50 shown in FIG. 1 which is used by the operator to steer the forklift 10. The forklift 10 includes a typically accelerator pedal and a typical brake pedal which are each used by an operator as is well understood. However, the vehicle 20 also must quickly change between a forward and reverse direction as indicated by the arrow 52 in FIG. 3.

The user interface 12 is shown in FIGS. 4-7 and includes various user inputs that are operable to control the various operational functions of the forklift 10 discussed above. A user rests their arm on the armrest 14 and grips the user interface 12 at a grip 56. The user's thumb is positioned to actuate any one of four user input devices 58, 60, 62, or 64 to control functions of the implement 24. The input device 58 is embodied as a roller rocker switch providing a proportional signal and with a neutral center position. The input device 58 controls the raising and lowering of the lift platform 28 as indicated by arrow 40 in FIG. 3. When the user applies pressure to the user input device 58 in the direction of arrow 70, the lift platform 28 is raised on the mast 26. Similarly, when pressure is applied to move the user input device 58 in the direction of arrow 72, the lift platform 28 is lowered on the mast 26. The user input device 58 provides a proportional signal so that additional deflection increases the speed of movement of the lift platform 58. Releasing of the user input device 58 returns it to the neutral position and stops movement of the lift platform 28. The user input device 62 is configured similarly to user input device 58 and is embodied as a roller rocker switch providing a proportional signal with a neutral position. Movement of the user input device 62 causes the forks 30, 32 to move apart or together as indicated by arrow 36.

User input device 60 is a two-position toggle switch that may be moved to a forward position to place the vehicle 20 in a forward operation mode so that the forklift 10 moves forward when the accelerator is actuated. Similarly, the reverse position causes the forklift 10 to move in reverse when the accelerator is actuated. In some embodiments, the user input device 60 may be a three-position toggle switch such that an intermediate position places the vehicle 20 in neutral so that the vehicle will not move if the accelerator is actuated.

The grip 56 is movable about a pitch axis 74 as indicated by an arrow 76. Movement of the grip 56 about the pitch axis 74 causes the mast 26 to tilt as indicated by arrow 42, with negative rotation causing the mast 26 to tilt with the top of the mast 26 toward the vehicle 20 and positive rotation causing the mast 26 to tilt with the top of the mast 26 moving away from the vehicle 20, thereby lowering the outboard ends of the forks 30, 32. The input from the grip 56 about the pitch axis 74 is a Hall Effect sensor that varies the input signal based on the magnitude of rotation about the axis 74 to proportionally change the speed of movement of the mast 26. Similarly, rotation of the grip 56 about a rotation axis 78 as indicated by an arrow 80 causes the lift platform 28 to move laterally relative to the mast 26 as indicated by arrow 38. The movement of the grip 56 about the rotation axis 78 is also measured by a Hall Effect sensor that varies with the magnitude of deviation from a neutral position, changing the speed of movement of the lift platform 28 in the lateral direction. The grip 56 is biased to a neutral position where it does not provide any input to either of the Hall Effect sensors.

The user input device 64 is a momentary push button that is operable to cause the mast 26 to be returned to a vertical position to level the forks 30, 32 relative to the ground. This prevents the user from dithering in operating the tilt of the mast 26 by eliminating the need for the user to find the level position visually while changing the tilt input by varying the degree of input into the grip 56 while rotating the grip 56 about the pitch axis 74.

The user interface 12 includes a housing 82 that is formed to include a storage compartment 84 that is sized to store a typical cell phone or other similar electronic device. The user interface 12 includes a USB receptacle 86, best seen in FIG. 6 that includes a cover 88 that is spring loaded and overlies a pair of USB outlets (not seen in the Figs.) that are positioned in the space defined by the storage compartment 84 so that a user may charge their cell phone or other electronic device while it is positioned in the storage compartment 84. The user interface 12 includes a rubber liner 90 positioned in the storage compartment 84, as seen in FIG. 7.

Figure 7:
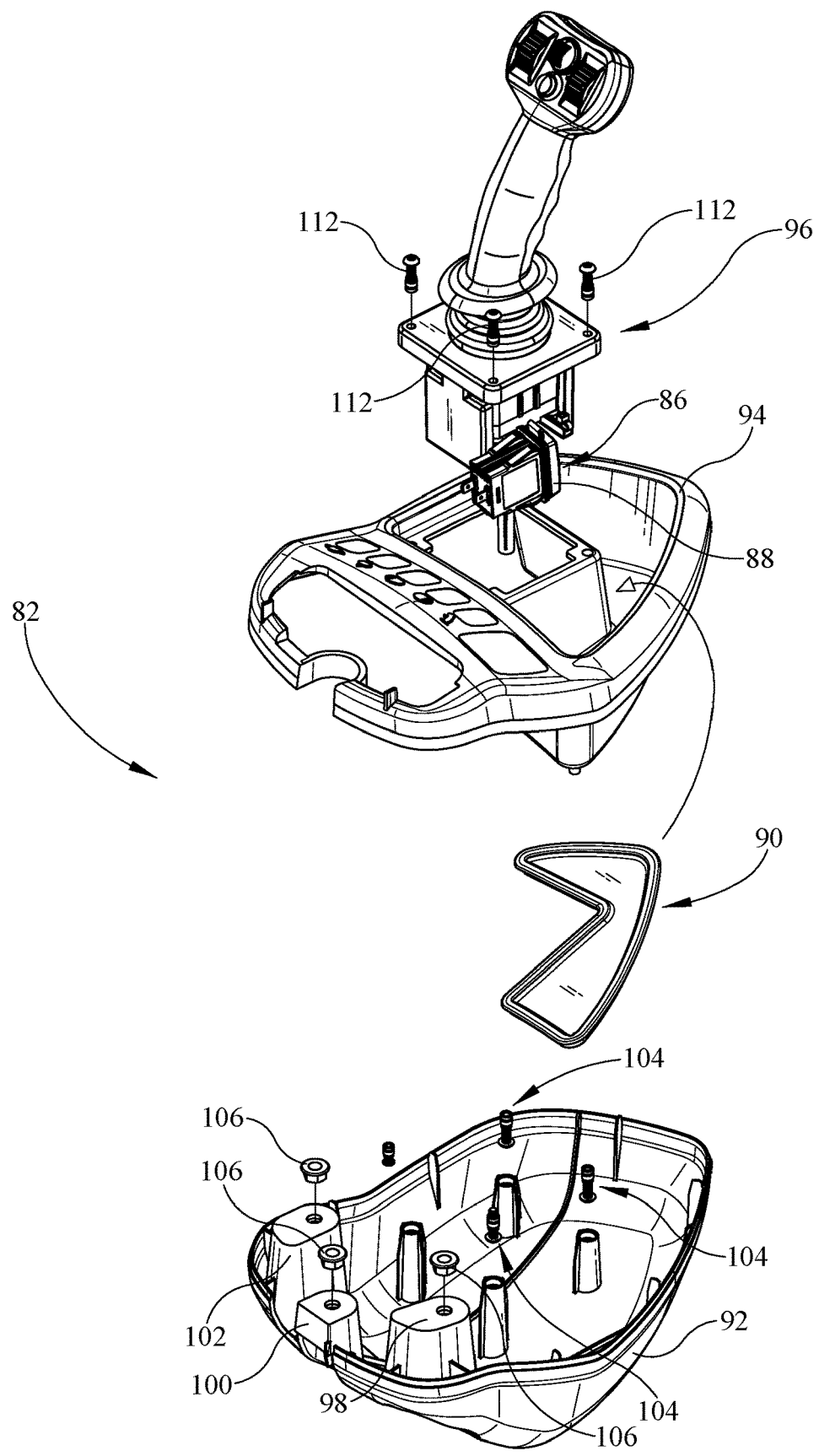
FIG. 7 is an exploded assembly view of the multi-function user interface of FIG. 1.

Referring to FIG. 7, the housing 82 includes a lower shell 92 and an upper shell 94 that are coupled together by a number of fasteners 104. A manipulator assembly 96, embodied a joystick-type device which includes the various functional switches discussed above, is secured to the upper shell 94 by a number of fasteners 112. The lower shell 92 is configured to be secured to the arm rest 14 by threaded studs (not shown) that extend from the arm rest 14 and that are positioned through three bosses 98, 100, and 102 formed in the lower shell 92 so that the user interface 12 is supported in a cantilevered fashion from the armrest 14. Three nuts 106 are used to secure the lower shell 92 to the armrest 14 by engaging with the threaded studs of the armrest 14.

Figure 5:
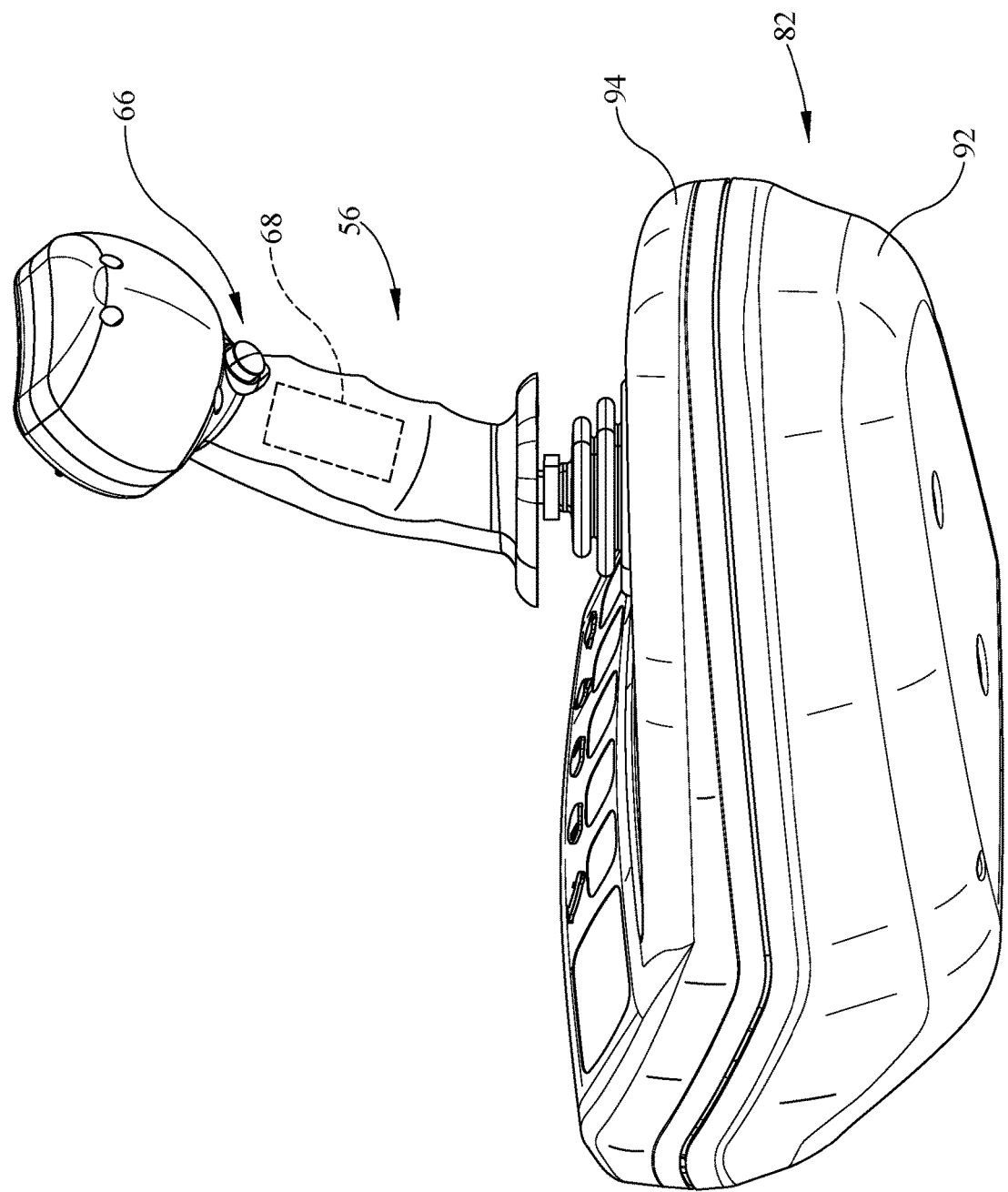
FIG. 5 is a front plan view of the multi-function user interface of FIG. 1.
Figure 6:
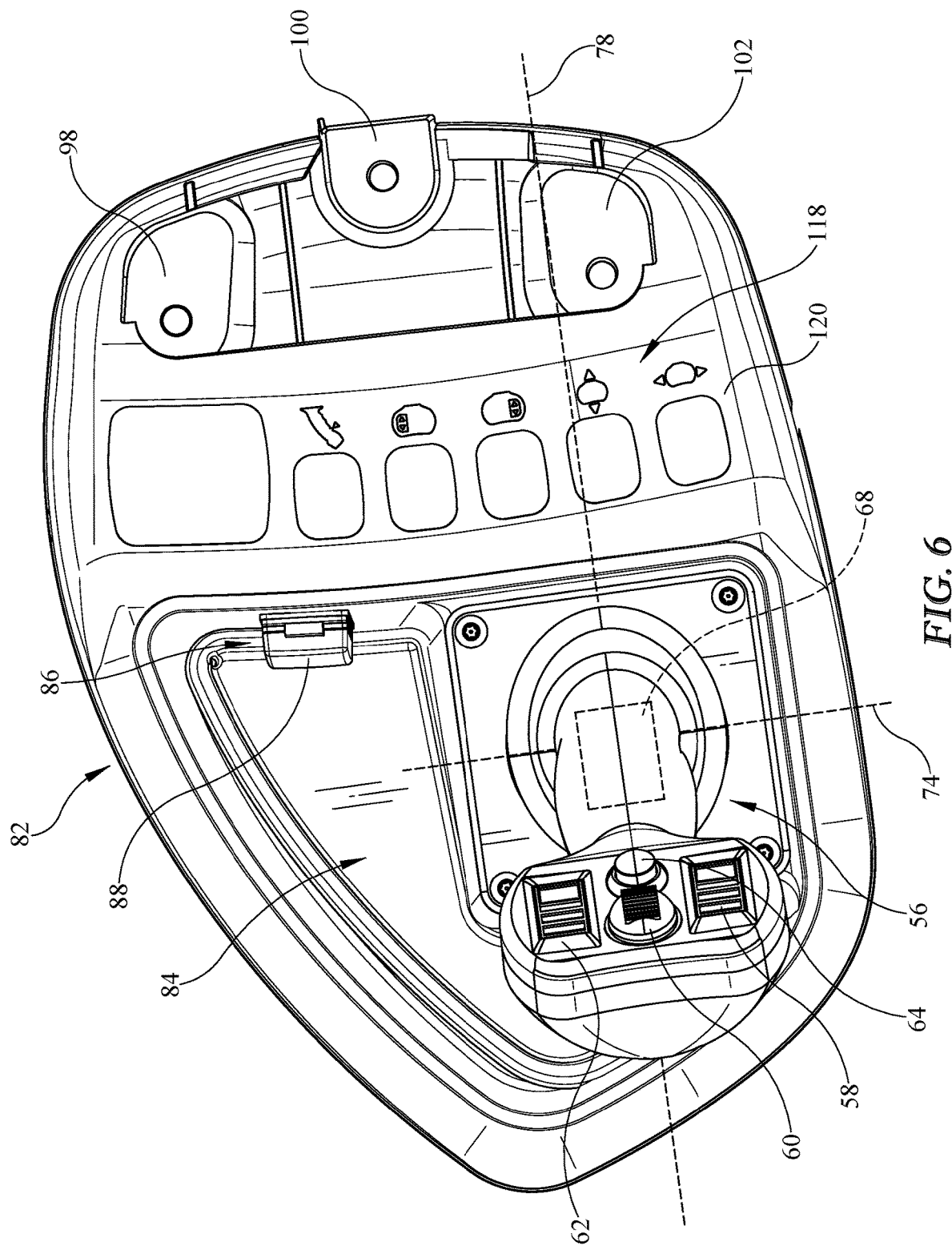
FIG. 6 is a top plan view of the multi-function user interface of FIG. 1.

Yet another input device 66, best seen in FIG. 5, is actuable by the trigger finger of a user gripping the grip 56 to honk the horn of the forklift 10. Finally, and importantly, the grip 56 includes a sensor 68 that is operable to detect the presence of a user's hand on the grip 56. The logic of the user interface 12 is limited such that a user's hand must be present and gripping the grip 56 to enable operation of the grip 56 and the user interface devices 58, 62, 64, 76 and 80. The sensor 68 is a capacitive sensor that is sensitive to a user's skin. This feature prevents the features controller by the user interface 12 from being operated when a user is not present on the forklift 10.

Figure 11:
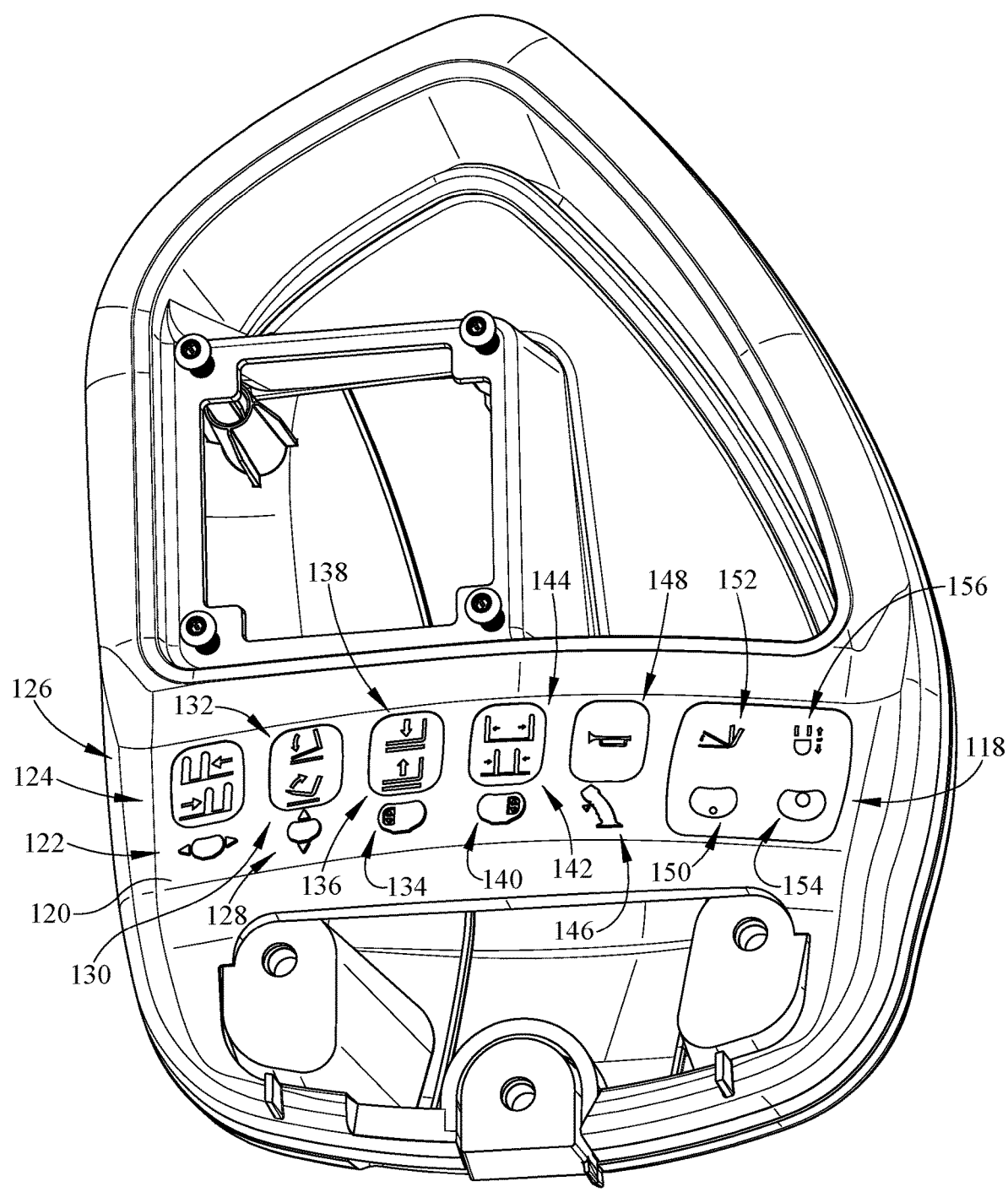
FIG. 11 is a top view of a housing of the user interface of the forklift of FIG. 1.
Figure 12:
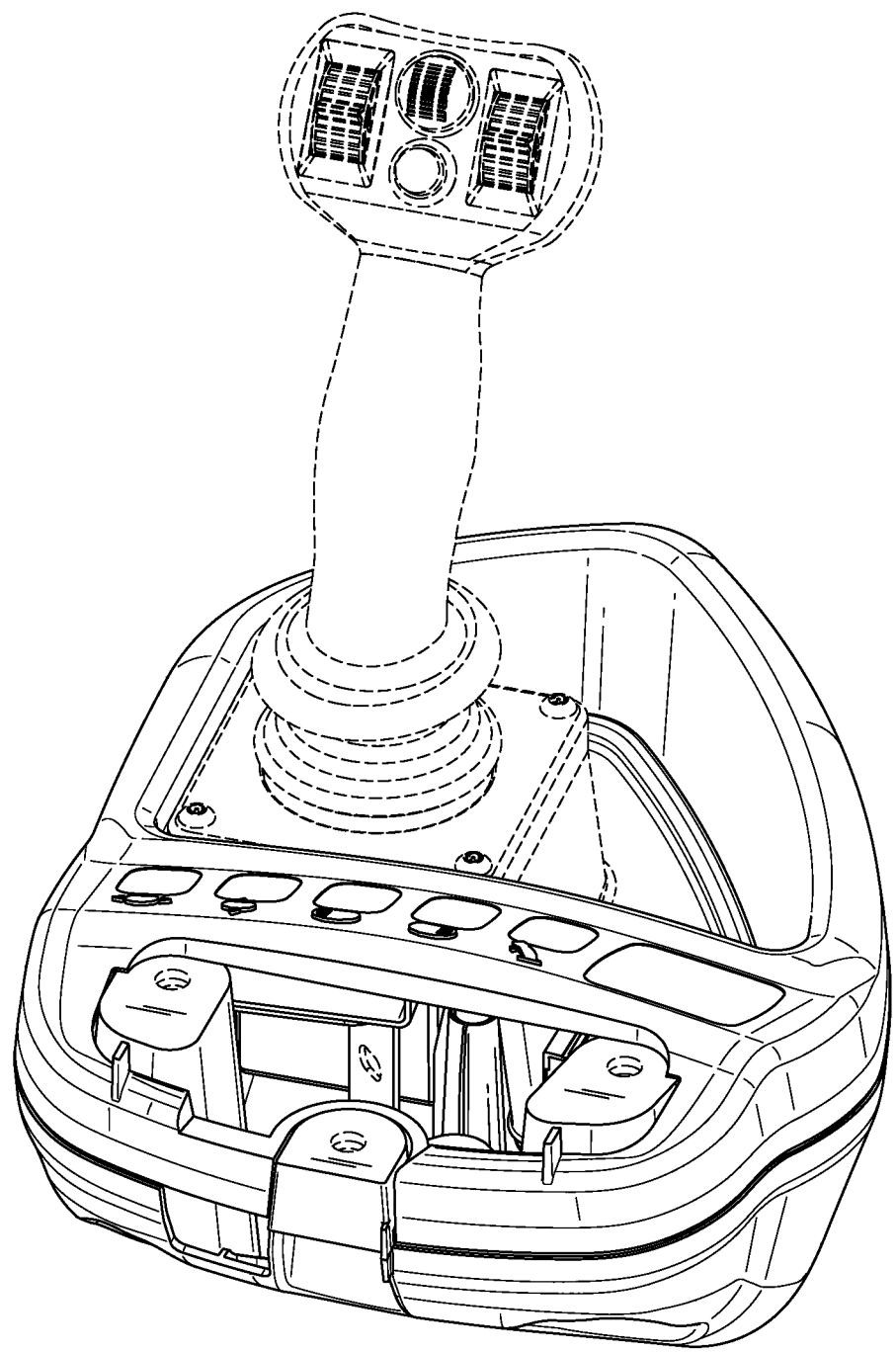
FIG. 12 is a front perspective view of an embodiment of a housing of a user interface in accordance with our design.
Figure 13:
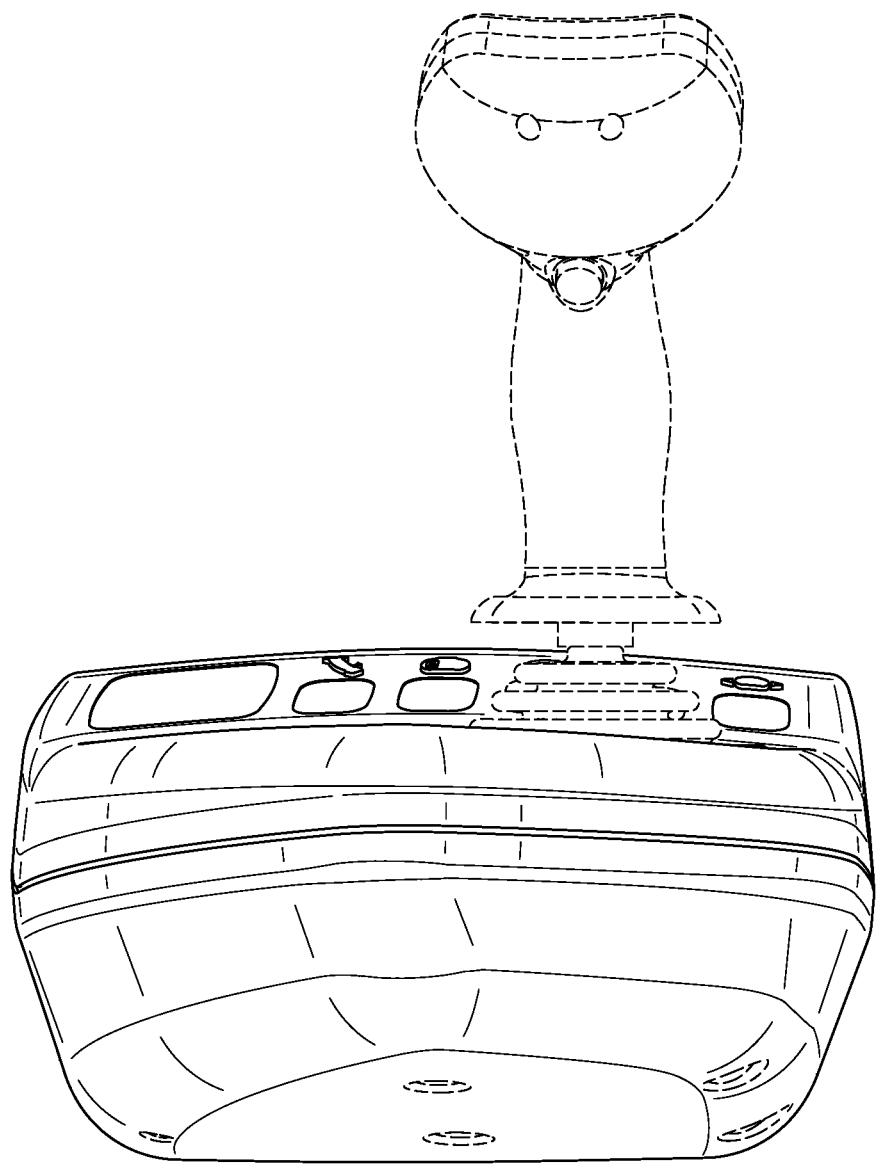
FIG. 13 is a front elevation view of the embodiment of FIG. 12.
Figure 14:
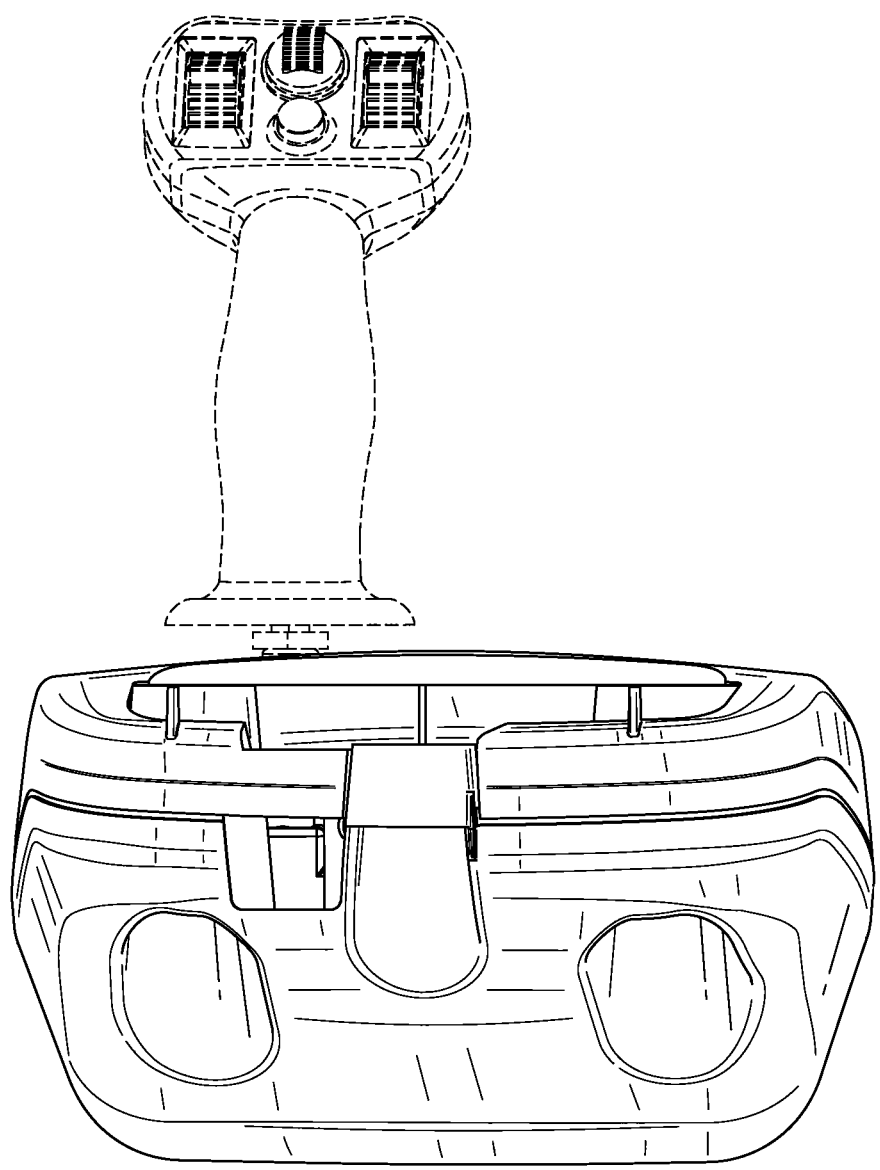
FIG. 14 is a back elevation view of the embodiment of FIG. 12.
Figure 15:
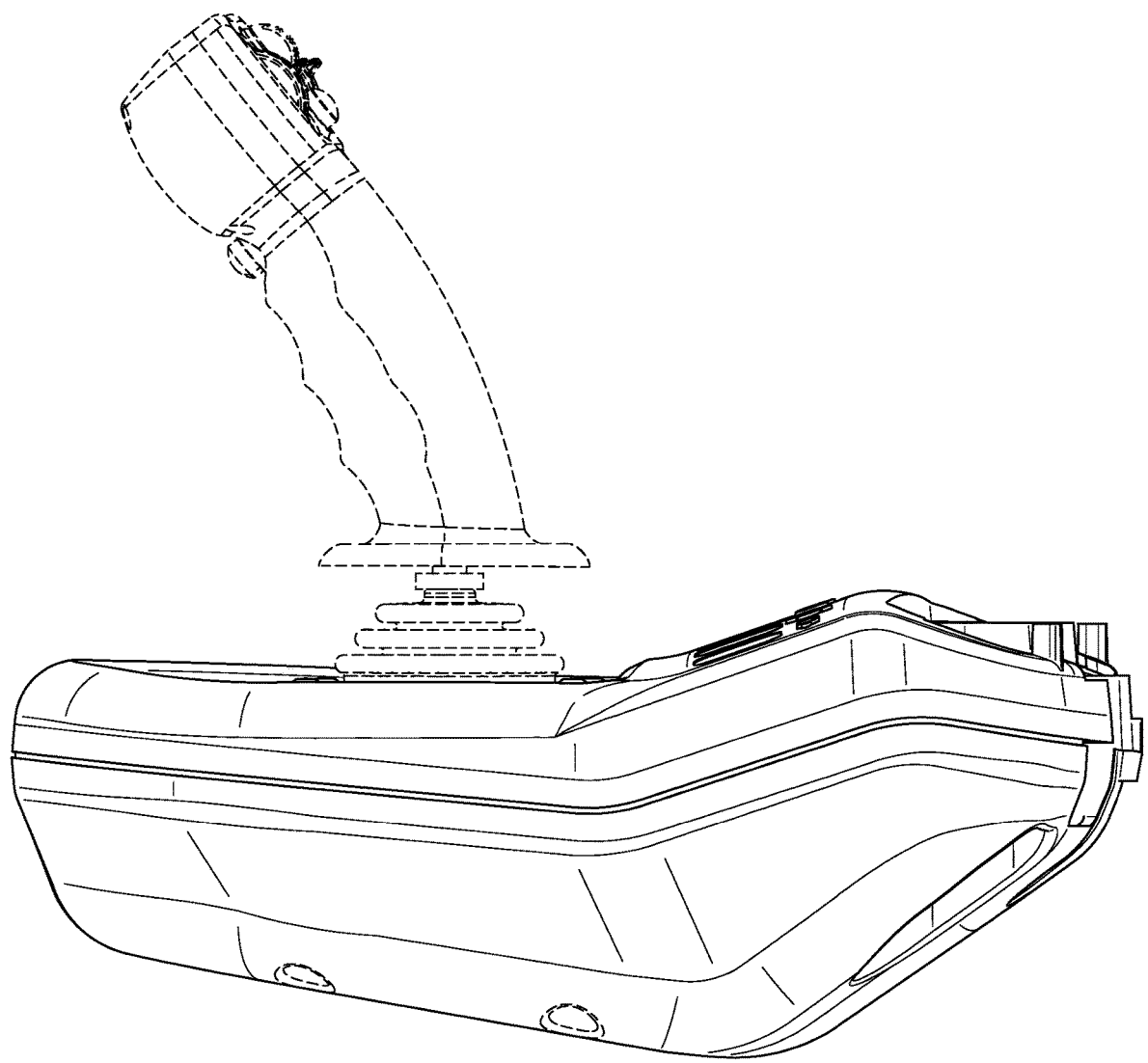
FIG. 15 is a left elevation view of the embodiment of FIG. 12.
Figure 16:
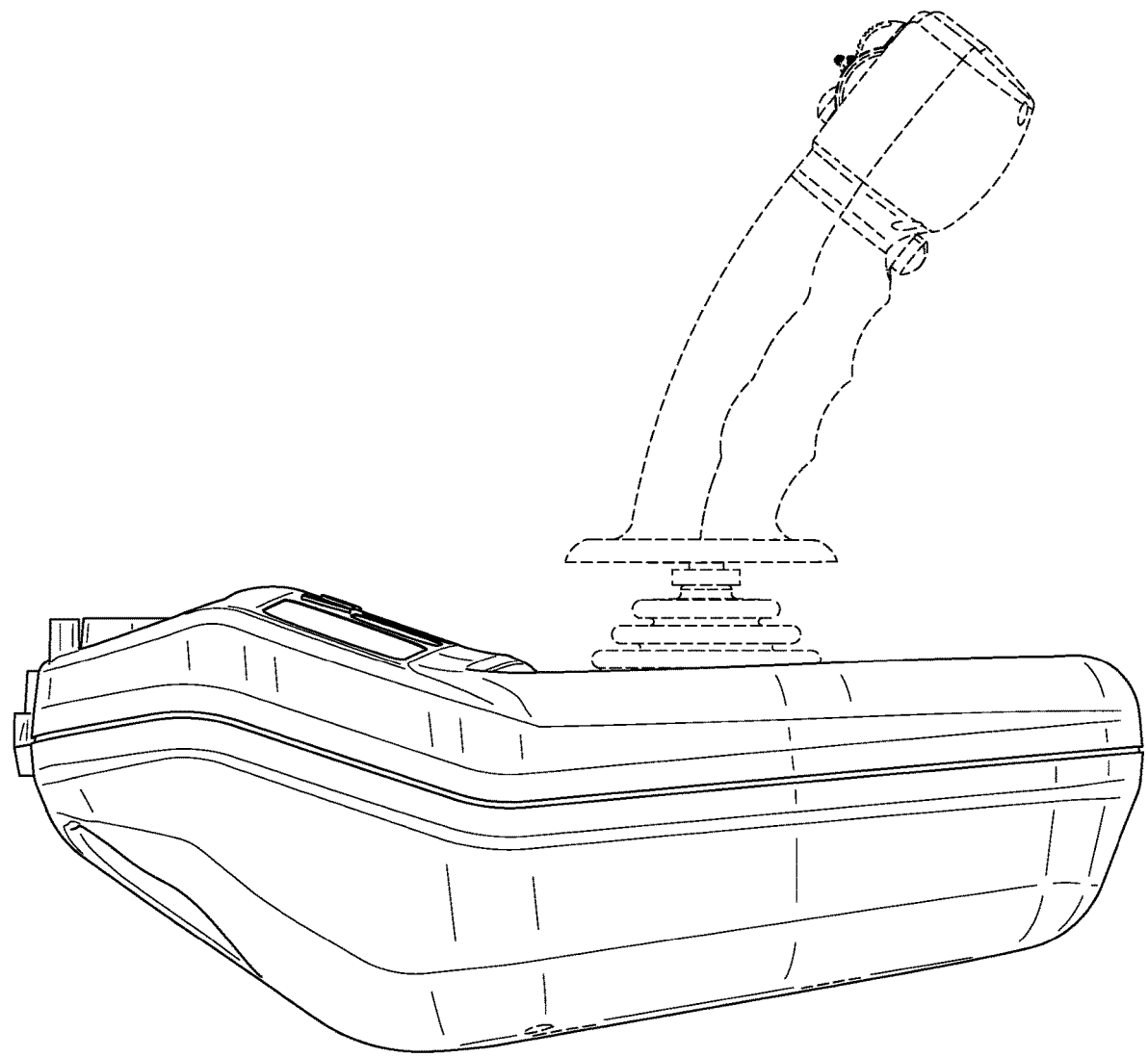
FIG. 16 is a right elevation view of the embodiment of FIG. 12.
Figure 17:
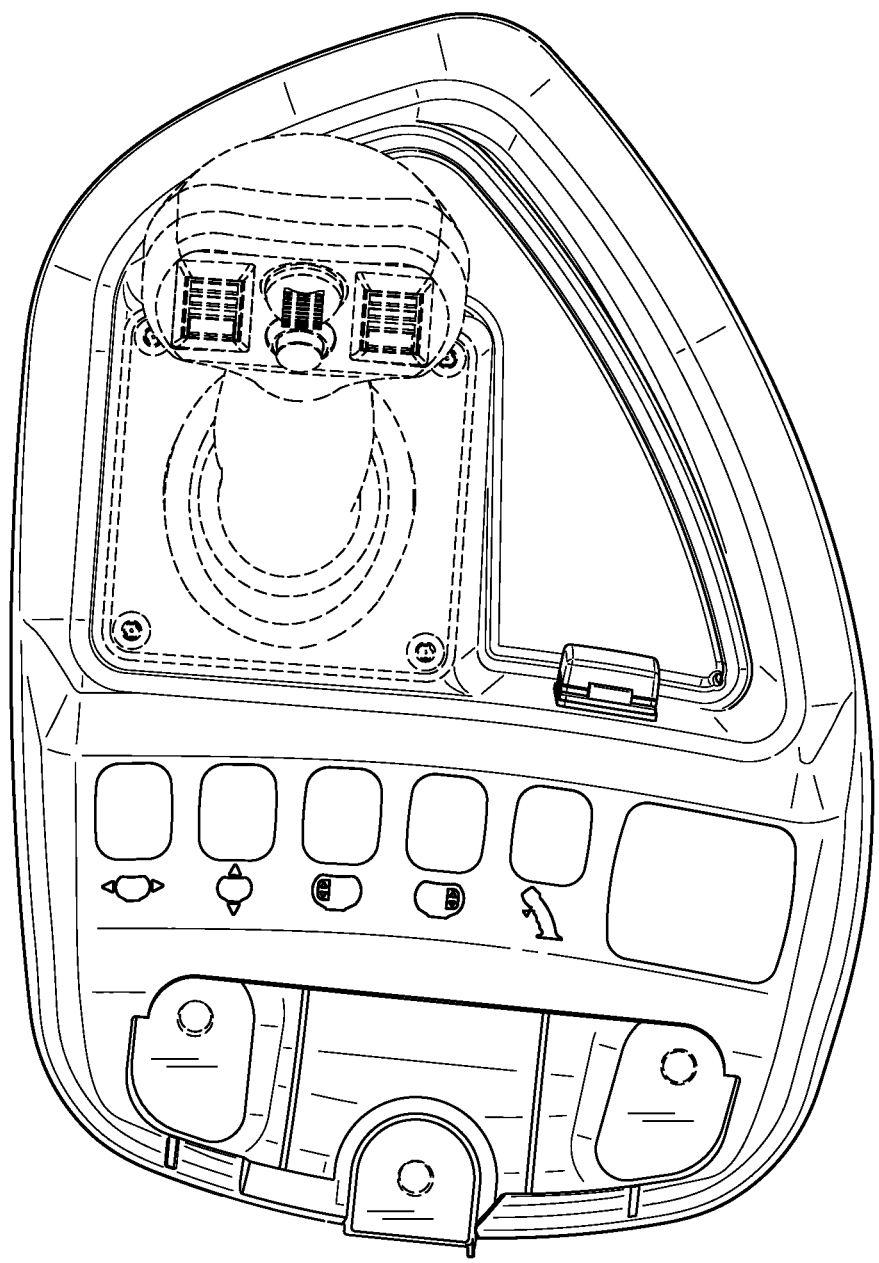
FIG. 17 is a top elevation view of the embodiment of FIG. 12.
Figure 18:
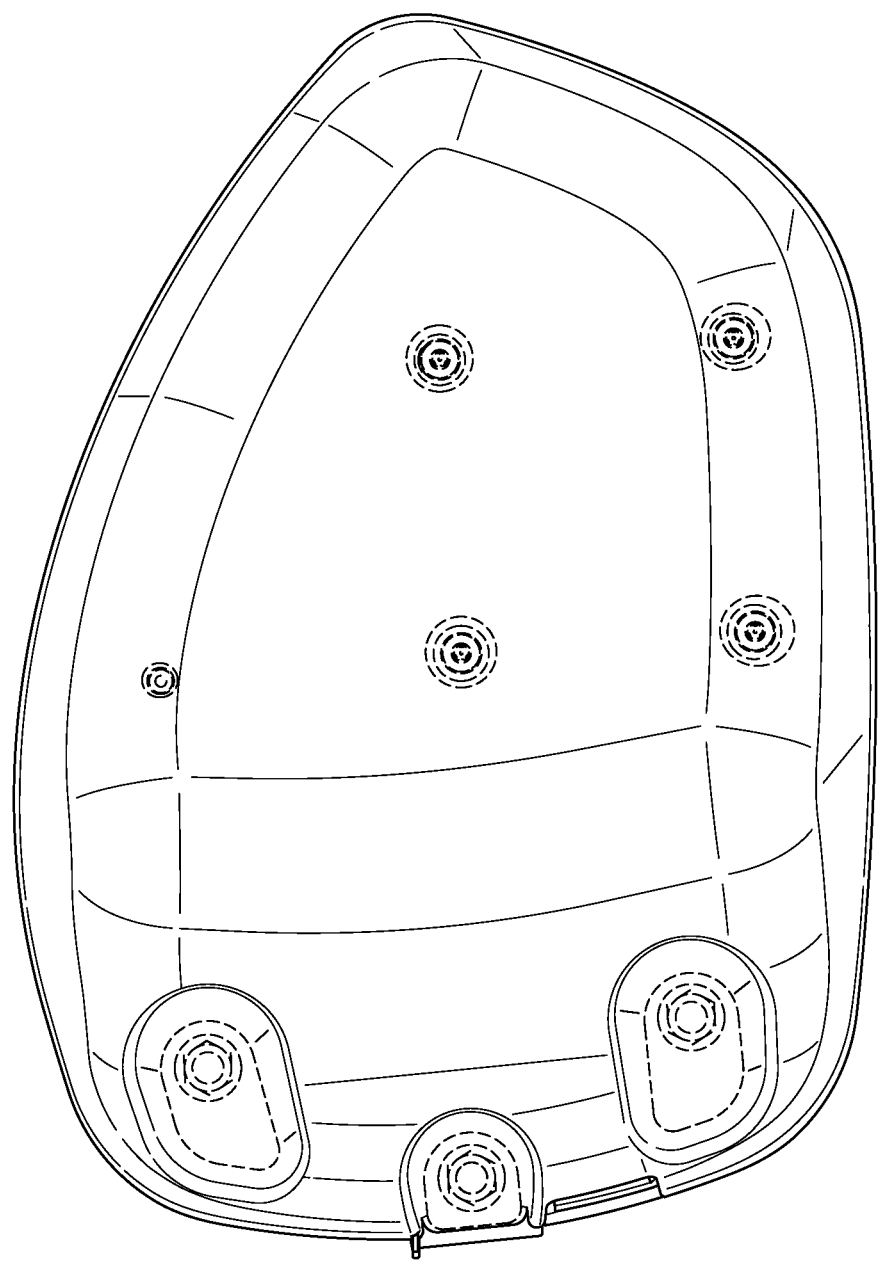
FIG. 18 is a bottom elevation view of the embodiment of FIG. 12.

Referring again to FIG. 1, a panel 118 is positioned on a surface 120 of the upper shell 94 and provides an indication to a user of the functions of the user input devices of described above. The panel 118 is shown in detail in FIG. 11 to include indicia 122, 128, 134, 140, and 146 which are formed to extend above the surface 120 in relief so that the indicia 122, 128, 134, 140, and 146 is resistant to wear and dirt to indicate the particular function.

The indicia 122 is associated with the lateral movement of the platform 28 accomplished by rotating the manipulator 56 about the axis 78, with the indicia 124 and 126 indicating that movement of the manipulator to the right and left moves the platform 28 to the right and left, respectively. The indicia 128 is associated with tilting of the mast 26 by moving the manipulator 56 about the axis 74, with forward movement of the manipulator 56 causing forward tilt of the mast 26 as indicated by indicia 132 and pulling back the manipulator 56 causing reverse tilt of the mast 26 as indicated by indicia 130.

Figure 4:
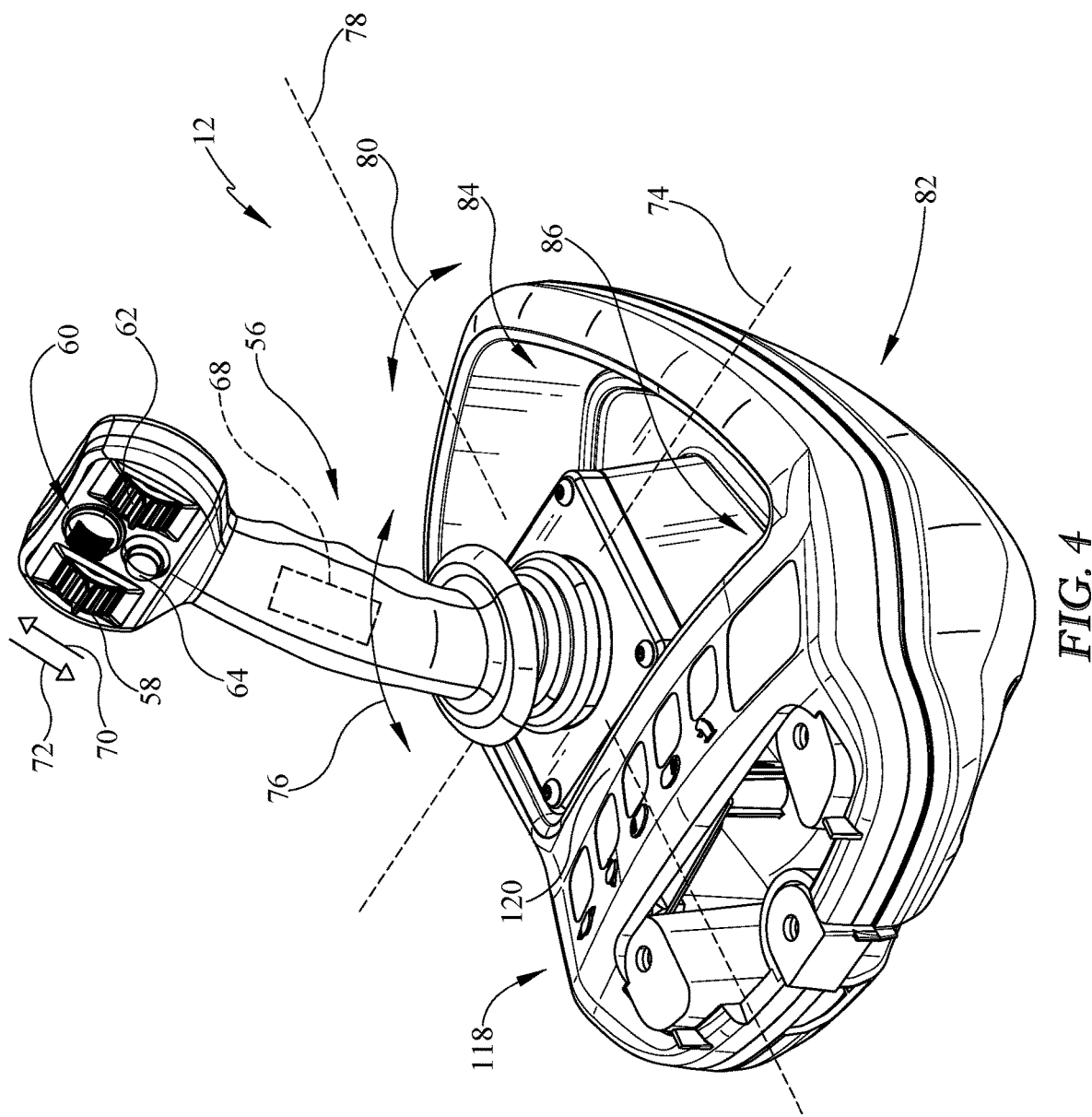
FIG. 4 is a perspective view of the multi-function user interface providing additional details of the multi-function user interface.

The indicia 134 is associated with vertical movement of the platform 28 as caused by actuation of the input 58 with movement of the input 58 in the direction of arrow 70 as shown in FIG. 4 associated with raising of the platform 28 as indicated by indicia 136 and movement of the input 58 in the direction of arrow 72 causing lowering of the platform 28 as indicated by indicia 138. The indicia 140 is associated with changing the width of the forks 30, 32 by activation of the input 62 with movement of the input 62 in the direction of arrow 70 as shown in FIG. 4 associated with narrowing the distance between the forks 30, 32 as indicated by indicia 142 and movement of the input 62 in the direction of arrow 72 causing spreading of the forks 30, 32 as indicated by indicia 144.

Indicia 146 is associated with input 66 and indicia 148 indicates that the input 66 operates a horn of the forktruck 10. Indicia 150 is associated with input 64 which levels the mast 26 as indicated by indicia 152. Similarly, indicia 154 is associated with input 60 which controls the direction of travel of the forktruck 10 as discussed above and as indicated by indicia 156.

It should be understood that the indicia 120, 124, 126, 130, 132, 134, 136, 138, 140, 142, 146, 148, 150, 152, 154, and 156 could all be over a different nature in other embodiments. Each could be a label or other graphical presentation. Each could also be provided in relief from the surface 120 in some embodiments. Still further, they could be collectively presented on a single label, broken up into single labels, or presented in predefined groups, in various embodiments.

Figure 8:
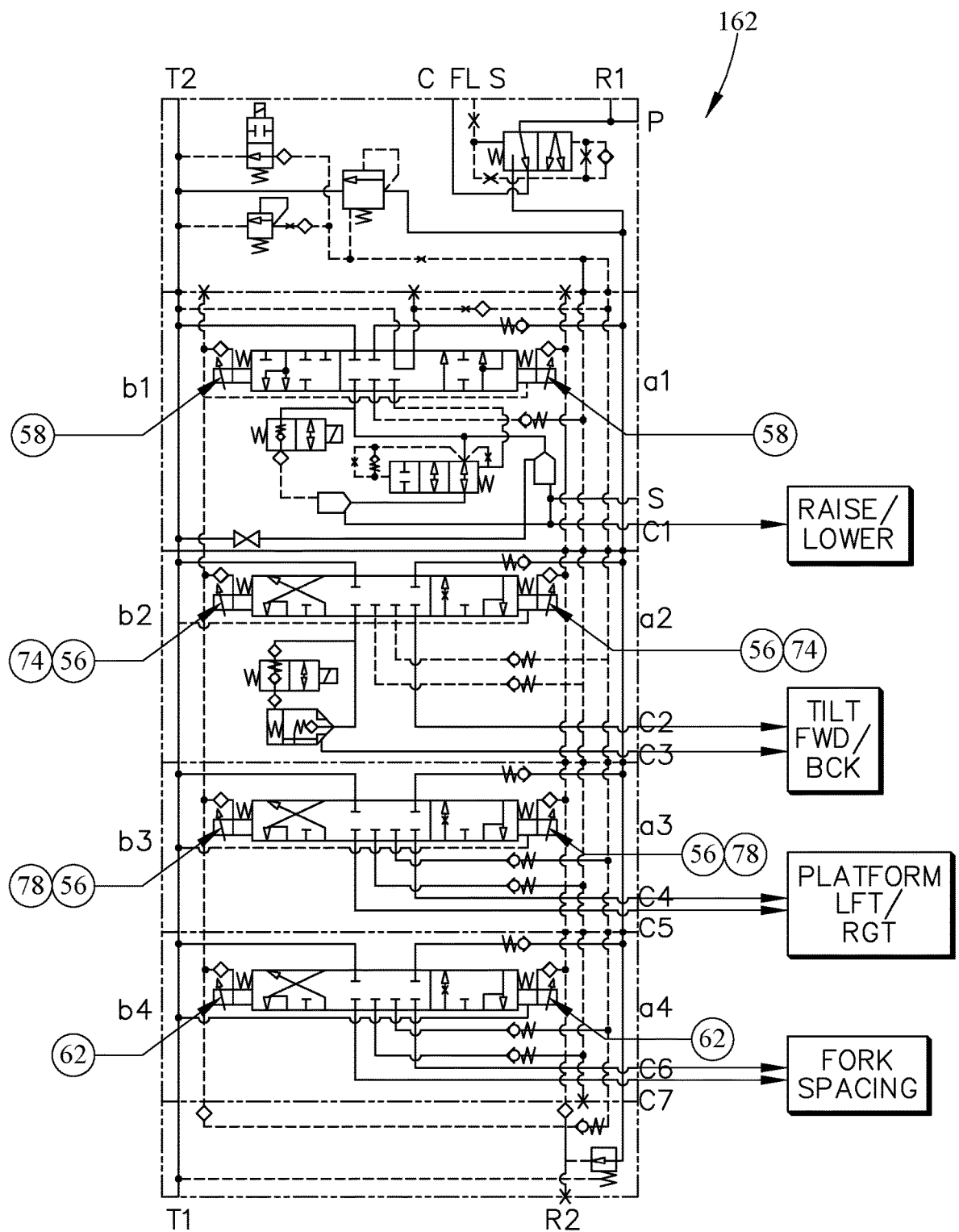
FIG. 8 is a schematic of the hydraulic circuit for operation of an implement of the forklift of FIG. 1.

Referring to FIG. 8, the hydraulic circuit used to operate the implement 24 is shown with reference to the input devices used to move the various components of the implement 24. It should be understood that while the present embodiment employs hydraulic circuits and hydraulic cylinders to effect motion of the implement. In other embodiments, the hydraulic system may be omitted and replaced with electric actuators. In some embodiments, certain operational functions may be controlled by hydraulic systems and actuators and other operation functions may be controlled by electric actuators. Still further, it should be understood that the functions of the implement 24 may be other than those disclosed herein and other functions may be controlled by the input devices of the user interface 12.

Figure 9:
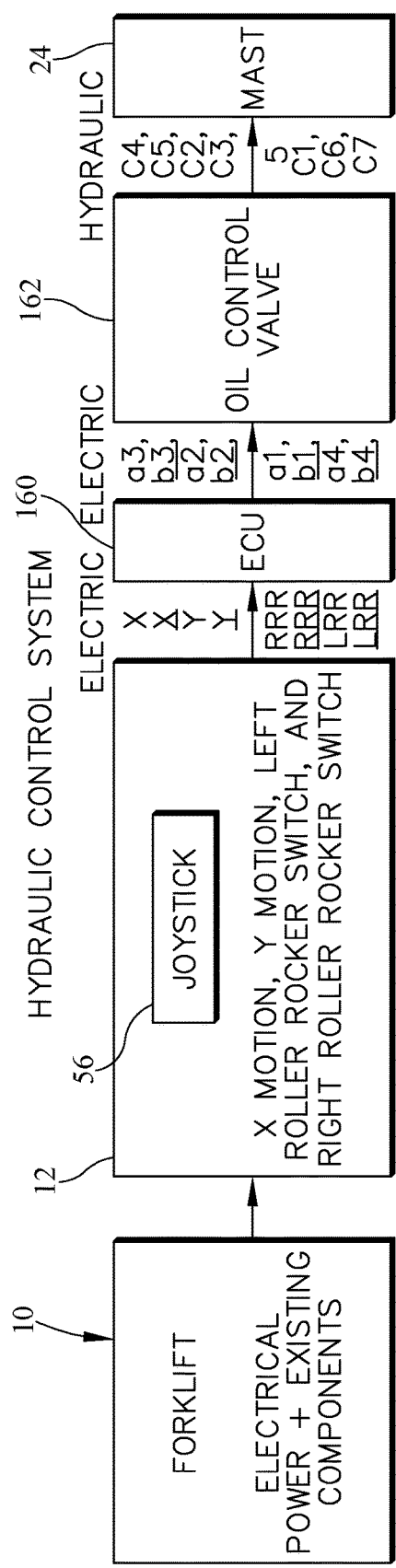
FIG. 9 is a block diagrammatic view of the control system of the forklift of FIG. 1.

Referring now to FIG. 9, a diagrammatic representation of the control structure for the implement 24 is shown progressively through the subsystem components. The user interface 12 is part of the forklift 10 and includes the joystick/manipulator 56 and the various input devices. Those input devices provide an input to an electronic control unit (ECU) 160 which has an embedded control structure which discriminates the inputs from the user interface 12 and provides the appropriate signals to the hydraulic control circuit 162 of FIG. 8 to control the operation of the mast 24. It should be understood that the ECU includes one or more processors and memory such that the memory includes instructions which, when processed by the processor, cause the processor to control the functions of the mast 24 and other aspects of the forklift 10 discussed above.

Figure 10:
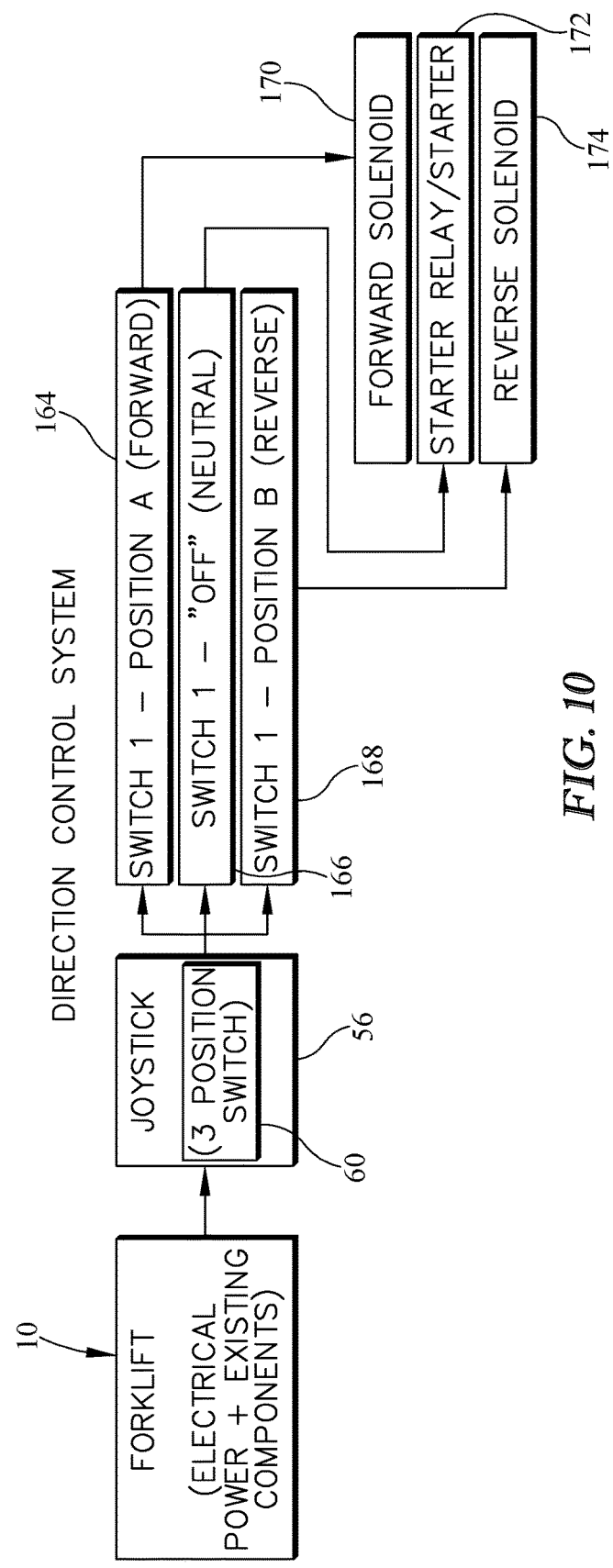
FIG. 10 is a block diagram of the control of direction control of the forklift of FIG. 1.

FIG. 10 is similar to FIG. 9, but shows the structure associated with user input 60 which controls the direction of movement of the forklift 10. When input 60 is in the forward position 164, the switch acts directly on a forward solenoid 170 which places the forklift 10 in a drive or forward configuration so that when the operator activates an accelerator, the forklift 10 moves in a forward direction. Similarly, when input 60 is in the reverse position 168, the switch acts directly on a reverse solenoid 174 which places the forklift 10 in a reverse configuration so that when the operator activates an accelerator, the forklift 10 moves in a reverse direction. When input 60 is in the neutral position 166, the switch acts activates a starter relay 172 which allows the forklift 10 to be started, but does not allow the forklift 10 to be moved until the input 60 is moved into either the forward position 164 or reverse position 168.

In use, a user will mount the forklift 10 and position themselves in the seat 16. The user interface 12 will be enabled when the grip 56 is gripped by a user to enable operation of the operational features of the implement 24 and the user input device 60. The user will operate the forklift 10 using the steering wheel 50, accelerator and brake, and, necessary, gripping the grip 56 to modify the operation of the implement 24 during operation. This approach allows the user to comfortably and quickly operate the features of the forklift 10 to maximize productivity.

FIGS. 12-18 are illustrations of the industrial design of the user interface 12 and show a particular design embodiment. It should be understood that other embodiments may have different scopes of design. For example, in some embodiments, the design may include the joystick/manipulator structure. In other embodiments, only portions of the housing 82 may be claimed. In still other embodiments, one or more of the indicia 120, 124, 126, 130, 132, 134, 136, 138, 140, 142, 146, 148, 150, 152, 154, and 156 may be included in the design.

Although this disclosure refers to specific embodiments, it will be understood by those skilled in the art that various changes in form and detail may be made without departing from the subject matter set forth in the accompanying claims.

The invention claimed is:

1. A forklift including a multi-function user interface, the multi-function user interface comprising:
   a housing extending from an underside of an armrest;
   a manipulator assembly supported by the housing, the manipulator assembly including
      a grip configured to be gripped by a user's hand,
      a first user input device configured to be actuated by a finger of the user's hand,
      a second user input device configured to be actuated by the finger
      a third user input device configured to be actuated by the finger,
      a fourth user input device configure to be actuated by the finger, and
      a sensor configured to detect the presence of the user's hand, the sensor being positioned on the grip; and
   an implement having a plurality of functions, the plurality of functions being controlled by inputs from the manipulator assembly,
   wherein
      the user interface includes logic that detects the presence of the user's hand on the grip and gripping the grip via the sensor before any input to control the implement is transmitted,
      the first user input device is a first rocker switch configured to vertically move the implement,
      the second user input device is a second rocker switch configured to horizontally spread and narrow a set of forks of the implement relative to one another,
      the third user input device is a momentary push button located between the first user input device and the second user input device, the third user input device being configured to return the set of forks to a level position when pressed, and
      the fourth user input device is a toggle switch located between the first user input device and the second user input device and configured to control a travel direction of the forklift.

2. The forklift of claim 1, wherein the grip is textured along a forward portion to accommodate fingers of the user's hand.

3. The forklift of claim 1, wherein the sensor comprises a capacitive sensor.

4. The forklift of claim 1, wherein the housing is configured to provide a storage space adjacent the manipulator assembly.

5. The forklift of claim 1, wherein the housing further includes a USB receptacle.

6. The forklift of claim 1, wherein the first and second user input devices provide proportional signals to control the implement.

7. The forklift of claim 1, wherein the manipulator assembly comprises a joystick.

8. The forklift of claim 1, wherein the manipulator assembly is positioned to be gripped by the user's hand while the user rests their arm on the armrest.

9. The forklift of claim 1, wherein the housing is mounted to the armrest via a lower shell of the housing.

10. The forklift of claim 9, wherein a portion of an upper shell of the housing is sandwiched between the lower shell and the armrest.

11. The forklift of claim 1, wherein a panel positioned on an upper shell of the housing between the armrest and the manipulator assembly provides a function indication of the first user input device to the user.

12. A manipulator assembly for controlling operating functions of an implement positioned on a front of a forklift, the manipulator assembly comprising: a grip configured to be gripped by a user's hand, a first user input device and a second user input device that are both positioned on the manipulator assembly and configured to be actuated by a finger of the user's hand, and a sensor positioned on the grip and configured to detect the user's hand, wherein a pair of forks of the implement is tilted when the grip is moved about a pitch axis, the first user input device controls a height of the pair of forks, the second user input device is a momentary input device operable to return the pair of forks to a level position relative to a ground surface with a single, predetermined, momentary actuation, and wherein the manipulator assembly detects the presence of the user's hand on the grip and gripping the grip via the sensor before any input to control a function of the implement is transmitted from the manipulator assembly.

13. The manipulator assembly of claim 12, wherein the manipulator assembly is supported by a housing configured to provide a storage space.

14. The manipulator assembly of claim 13, wherein the housing further includes a USB receptacle.

15. The manipulator assembly of claim 12, wherein the sensor comprises a capacitive sensor.

16. The manipulator assembly of claim 12, wherein the first user input device provides a proportional signal to control the implement.

17. The manipulator assembly of claim 12, wherein the manipulator assembly comprises a joystick.

18. The manipulator assembly of claim 12, wherein the manipulator assembly is positioned to be gripped by the user's hand while the user rests their arm on an armrest.

19. The manipulator assembly of claim 12, wherein the manipulator assembly includes a third user input device that controls a tilt of the pair of forks of the implement.

20. The manipulator assembly of claim 12, wherein the manipulator assembly includes a third user input device that controls a lateral position of the pair of forks of the implement.

21. The manipulator assembly of claim 12, wherein when the first user input device is released, the first user input device returns to a neutral position and movement of the pair of forks stops.

22. The manipulator assembly of claim 12, wherein the manipulator assembly includes a third user input device that controls a spacing of components of the pair of forks.

23. The manipulator assembly of claim 12, wherein rotational movement of the grip is measured by a Hall Effect sensor.

24. The manipulator assembly of claim 12, wherein the second user input device is a momentary push button.

25. The manipulator assembly of claim 12, wherein activating the second user input device causes the pair of forks to become level relative to the ground surface automatically.

26. The manipulator assembly of claim 12, wherein the implement is supported by a tiltable mast.

27. The manipulator assembly of claim 26, wherein the second user input device is operable to plumb the tiltable mast relative to the ground surface.

\* \* \* \* \*